US012676675B2

(12) United States Patent
Wang et al.

(10) Patent No.: US 12,676,675 B2
(45) Date of Patent: Jul. 7, 2026

(54) COMMUNICATION METHOD AND APPARATUS, AND OPTICAL BUS NETWORK

(71) Applicant: HUAWEI TECHNOLOGIES CO., LTD., Shenzhen (CN)

(72) Inventors: Yuzhou Wang, Sao Paulo (BR); Bo Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 18/487,226

(22) Filed: Oct. 16, 2023

(65) Prior Publication Data

US 2024/0048239 A1 Feb. 8, 2024

Related U.S. Application Data

(63) Continuation of application No. PCT/CN2022/079417, filed on Mar. 4, 2022.

(30) Foreign Application Priority Data

Apr. 19, 2021 (CN) .......................... 202110420859.8

(51) Int. Cl.
*H04B 10/278* (2013.01)
*H04Q 11/00* (2006.01)

(52) U.S. Cl.
CPC ....... *H04B 10/278* (2013.01); *H04Q 11/0062* (2013.01); *H04Q 11/0067* (2013.01);
(Continued)

(58) Field of Classification Search
CPC ............. H04B 10/278; H04Q 11/0062; H04Q 11/0067; H04Q 2011/0079; H04Q 2011/0064
(Continued)

(56) References Cited

U.S. PATENT DOCUMENTS

2003/0133460 A1* 7/2003 Lee ........................ H04J 3/0682
370/395.51
2009/0110395 A1* 4/2009 Lee ..................... H04J 14/0267
398/48
(Continued)

FOREIGN PATENT DOCUMENTS

EP 3908007 A1 * 11/2021 ........... H04B 10/272

OTHER PUBLICATIONS

IEEE Std 802.3™-2018, IEEE Standard for Ethernet LAN/MAN Standards Committee of the, IEEE Computer Society, Approved Jun. 14, 2018, total 5600 pages.
(Continued)

*Primary Examiner* — Li Liu
(74) *Attorney, Agent, or Firm* — HAUPTMAN HAM, LLP

(57) ABSTRACT

A communication method and apparatus, and an optical bus network. A controller sends, in response to discovering a target optical head end, a target optical head end identifier to the target optical head end, where the target optical head end identifier identifies the target optical head end. The controller determines a target management protocol from management protocols supported by the target optical head end. The controller communicates target information with the target optical head end based on the target optical head end identifier and the target management protocol, where the target information is used by the controller to manage the target optical head end and/or at least one optical terminal managed by the target optical head end.

20 Claims, 7 Drawing Sheets

(52) U.S. Cl.

CPC ................ *H04Q 2011/0064* (2013.01); *H04Q 2011/0079* (2013.01)

(58) Field of Classification Search

USPC ............................................. 398/58, 60, 67

See application file for complete search history.

(56) References Cited

U.S. PATENT DOCUMENTS

| | | | | |
|---|---|---|---|---|
| 2010/0142944 A1* | 6/2010 | Zou | ................... | H04Q 11/0067 |
| | | | | 398/58 |
| 2011/0268435 A1* | 11/2011 | Mizutani | .............. | H04L 45/243 |
| | | | | 398/5 |
| 2020/0120408 A1* | 4/2020 | Boyd | ................. | H04L 41/0886 |
| 2021/0003996 A1* | 1/2021 | Nagabhairava | .... | G05B 19/4183 |

OTHER PUBLICATIONS

International Search Report issued in corresponding International Application No. PCT/CN2022/079417, dated May 26, 2022, pp. 1-10.

Extended European Search Report issued in corresponding European Application No. 22790729.2, dated Jul. 26, 2024, pp. 1-8.

Extended European Search Report issued in corresponding European Application No. 22790729.2, dated Jul. 26, 2024, pp. 1-7.

\* cited by examiner

Architecture in which the PLC and
the optical head end are combined

Architecture in which the PLC and
the optical head end are separated

OSI reference
model

Optical bus model

| Byte | Bit offset | | | | | | | |
|---|---|---|---|---|---|---|---|---|
| | 7 | 6 | 5 | 4 | 3 | 2 | 1 | 0 |
| - | Type | | | | cmd | | | |
| 1 | Destination ID | | | | | | | |
| 2 | | | | | | | | |
| 3 | Source ID | | | | | | | |
| 4 | | | | | | | | |
| 5 | Offset 1 | | | | | | | |
| 6 | Offset 0 | | | | len1 | | | |
| 7 | len0 | | | | | | | |
| 8 | sn | | | | | | | |
| 9 | pri | | | r | t_ind | eop_ind | r | r |
| 10 | Control word (downlink)/Event (8b)+Error code (8b) (uplink) | | | | | | | |
| 11 | | | | | | | | |
| 12~n | Payload area | | | | | | | |
| n+1 | BIP-8 | | | | | | | |

| | | |
|---|---|---|
| 2 bytes | T type | TLV structure 1 |
| 2 bytes | L length | |
| n bytes | V value | |
| 2 bytes | T type | TLV structure 2 |
| 2 bytes | L length | |
| n bytes | V value | |

COMMUNICATION METHOD AND APPARATUS, AND OPTICAL BUS NETWORK

CROSS-REFERENCE TO RELATED APPLICATIONS

This application is a continuation of International Application No. PCT/CN2022/079417, filed on Mar. 4, 2022, which claims priority to Chinese Patent Application No. 202110420859.8, filed on Apr. 19, 2021. The disclosures of the aforementioned applications are hereby incorporated by reference in their entireties.

BACKGROUND

A fieldbus (fieldbus) is a kind of industrial data bus developed rapidly in recent years. A field bus is mainly used to resolve a problem of digital communication between field equipment such as intelligent instruments, controllers, execution mechanisms on an industrial field, and information transmission between the field equipment and an advanced control system. At present, most fieldbus-based industrial control networks are serial network architectures based on the Ethernet (Ethernet), which have problems such as a high latency (a millisecond level), a low bandwidth, a poor capability of bearing a secondary station, and a poor anti-interference capability, and cannot meet higher usage by future industrial control networks in various aspects.

With rapid development of the communication industry, an optical communication technology that uses an optical wave as an information carrier has become a main transmission method in world communication because of its wide transmission frequency band, high anti-interference capability, and low signal attenuation, which are far better than transmission of cable or microwave communication.

At present, there is no solution for how to introduce the optical communication technology to industrial control networks and manage newly introduced optical communication devices.

SUMMARY

Embodiments described herein provide a communication method and apparatus, and an optical bus network, to provide a management mechanism by a controller for an optical head end and/or at least one optical terminal managed by the optical head end in the optical bus network.

According to a first aspect, at least one embodiment provides a communication method, where the method is applied to an optical bus network, the optical bus network includes a target optical head end and at least one optical terminal managed by the target optical head end, the optical bus network further includes a controller, and the method includes: The controller sends, in response to discovering the target optical head end, a target optical head end identifier to the target optical head end, where the target optical head end identifier is for identifying the target optical head end; the controller determines a target management protocol from management protocols supported by the target optical head end; and the controller communicates target information with the target optical head end based on the target optical head end identifier and the target management protocol, where the target information is used by the controller to manage the target optical head end and/or the at least one optical terminal managed by the target optical head end.

Based on this solution, in an optical bus network, a controller used as a management center sends a target optical head end identifier to a discovered target optical head end, and determine a target management protocol. Further, the controller manages, based on the target optical head end identifier and the target management protocol, the target optical head end and at least one optical terminal managed by the target optical head end. This solution is used for transmission of a plurality of types of target information, and has good scalability.

In at least one embodiment, the target management protocol is for defining a frame structure of a message that carries the target information, the frame structure includes a header field and a payload field, the target optical head end identifier is located in the header field, and the target information is located in the payload field. In this way, transmission of a plurality of types of target information is implemented by extending a definition of the payload field, and a management range of the controller for the target optical head end and/or the at least one optical terminal managed by the target optical head end is further improved.

In at least one embodiment, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

Based on this solution, the controller or the target optical head end encapsulates target information of a same type for different objects into at least one TLV structure in the payload field, to improve management efficiency.

In at least one embodiment, the frame structure further includes another field for carrying other information that needs to be further transmitted. For example, the frame structure further includes a protocol data unit PDU type field, the PDU type field in the frame structure is for carrying a predetermined value, and the predetermined value indicates that the frame structure is a management protocol frame structure. In this way, frame structures for implementing different purposes is distinguished through the PDU type field. For example, the frame structure further includes a command indicator, and the command indicator indicates that the frame structure corresponds to any one of the following message types: a read operation, a read response operation, a set operation, a set response operation, and an event report operation. For example, the frame structure further includes an event field, and the event field is for carrying alarm event information reported by the target optical head end to the controller.

This is merely an example description of fields included in the frame structure and constitutes no limitation. During a specific implementation, the fields included in the frame structure is defined or negotiated based on a service usage, an application scenario, or the like in the frame structure. Details are not described herein again.

In at least one embodiment, that the controller sends, in response to discovering the target optical head end, a target optical head end identifier to the target optical head end includes: The controller broadcasts a discovery packet, where the discovery packet includes a destination identifier corresponding to the discovery packet; the controller receives a discovery packet response sent by the target optical head end based on the destination identifier, where the discovery packet response includes a media access control MAC address of the target optical head end; and the controller sends the target optical head end identifier to the target optical head end based on the MAC address of the target optical head end.

Based on this solution, the controller discovers the target optical head end in a broadcast discovery manner, and indicate the target optical head end to report a MAC address of the target optical head end, so that the controller sends a unique target optical head end identifier to the target optical head end, and manages and maintains the target optical head end based on the target optical head end identifier.

In at least one embodiment, that the controller determines a target management protocol from management protocols supported by the target optical head end includes: The controller receives first version information from the target optical head end, where the first version information indicates a version of each of the management protocols supported by the target optical head end; and the controller determines, based on the first version information, the target management protocol from the management protocols supported by the target optical head end.

Based on this solution, the controller learns of, based on the first version information reported by the target optical head end, the management protocols supported by the target optical head end, to determine the target management protocol through negotiation. In at least one embodiment, the first version information is actively reported by the target optical head end, or is reported by the target optical head end in response to a query message from the controller. A reporting mechanism of the first version information is not limited in at least one embodiment.

In at least one embodiment, that the controller determines, based on the first version information, the target management protocol from the management protocols supported by the target optical head end includes: The controller determines, based on the first version information and second version information, the target management protocol from management protocols supported by both the controller and the optical head end, where the second version information indicates a version of each of management protocols supported by the controller. For example, the target management protocol is a management protocol of a latest version supported by both the controller and the target optical head end.

In at least one embodiment, the optical bus network includes a plurality of optical head ends, and the target optical head end is any one of the plurality of optical head ends, where the controller and the target optical head end are located in a same physical entity; or the controller is disposed independently of the plurality of optical head ends.

According to a second aspect, at least one embodiment provides a communication method, where the method is applied to an optical bus network, the optical bus network includes a target optical head end and at least one optical terminal managed by the target optical head end, the optical bus network further includes a controller, and the method includes: The target optical head end receives a target optical head end identifier from the controller, where the target optical head end identifier is sent by the controller in response to the controller discovering the target optical head end and is for identifying the target optical head end; and the target optical head end transmits target information to the controller based on the target optical head end identifier and a target management protocol, where the target information is used by the controller to manage the target optical head end and/or the at least one optical terminal managed by the target optical head end, and the target management protocol is determined by the controller from management protocols supported by the target optical head end.

In at least one embodiment, the target management protocol is for defining a frame structure of a message that carries the target information, the frame structure includes a header field and a payload field, the target optical head end identifier is located in the header field, and the target information is located in the payload field.

In at least one embodiment, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

In at least one embodiment, the frame structure further includes a PDU type field, the PDU type field in the frame structure is for carrying a predetermined value, and the predetermined value indicates that the frame structure is a management protocol frame structure.

In at least one embodiment, the optical bus frame structure further includes a command indicator, and the command indicator indicates that the optical bus frame structure corresponds to any one of the following message types: a read operation, a read response operation, a set operation, a set response operation, and an event report operation.

In at least one embodiment, the frame structure further includes an event field, and the event field is for carrying alarm event information reported by the target optical head end to the controller.

In at least one embodiment, that the target optical head end receives a target optical head end identifier from the controller includes: The target optical head end receives a discovery packet from the controller, where the discovery packet includes a destination identifier corresponding to the discovery packet; the target optical head end sends a discovery packet response to the controller based on the destination identifier, where the discovery packet response includes a MAC address of the target optical head end; and the target optical head end receives the target optical head end identifier sent by the controller based on the MAC address of the target optical head end.

In at least one embodiment, the method further includes: The target optical head end sends first version information to the controller based on the target optical head end identifier, where the first version information indicates a version of each of the management protocols supported by the target optical head end.

In at least one embodiment, the target management protocol is a management protocol of a latest version supported by both the target optical head end and the controller.

In at least one embodiment, the target optical head end has a broadcast discovery state, a unicast discovery state, and a working state, where in response to the target optical head end being in the broadcast discovery state, the target optical head end is configured to receive the target optical head end identifier from the controller; after receiving the target optical head end identifier from the controller, the target optical head end is configured to communicate with the controller in the unicast discovery state based on the target optical head end identifier, so that the controller determines the target management protocol; and in response to the target optical head end is in the working state, the target optical head end is configured to transmit the target information to the controller based on the target optical head end identifier and the target management protocol.

In at least one embodiment, the optical bus network includes a plurality of optical head ends, and the target optical head end is any one of the plurality of optical head ends, where the controller and the target optical head end are located in a same physical entity; or the controller is disposed independently of the plurality of optical head ends.

According to a third aspect, at least one embodiment provides a communication apparatus. The communication apparatus has a function of implementing the controller in the first aspect. This function is implemented by using hardware, or is implemented by executing corresponding software by hardware. The hardware or the software includes one or more units or modules corresponding to the foregoing function.

In at least one embodiment, the communication apparatus is a controller, or a module in a controller, for example, a chip, a chip system, or a circuit. For beneficial effects, refer to the description of the first aspect. Details are not described herein again. The communication apparatus includes a transceiver and a processor. The processor is configured to support the communication apparatus in performing a corresponding function of the controller shown above. The transceiver is configured to support communication between the communication apparatus and an optical head end or an optical terminal. The transceiver is an independent receiver, an independent transmitter, a transceiver Integrating a transceiver function, or an interface circuit. Optionally, the communication apparatus further includes a memory. The memory is coupled to the processor, and the memory stores program instructions and data that are used for the communication apparatus.

The transceiver sends a target optical head end identifier to a target optical head end in response to the controller discovering the target optical head end, where the target optical head end identifier is for identifying the target optical head end; the processor determines a target management protocol from management protocols supported by the target optical head end; and the processor communicates target information with the target optical head end based on the target optical head end identifier and the target management protocol by using the transceiver, where the target information is used by the controller to manage the target optical head end and/or at least one optical terminal managed by the target optical head end.

In at least one embodiment, the target management protocol is for defining a frame structure of a message that carries the target information, the frame structure includes a header field and a payload field, the target optical head end identifier is located in the header field, and the target information is located in the payload field.

In at least one embodiment, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

In at least one embodiment, the frame structure further includes another field for carrying other information that needs to be further transmitted. For example, the frame structure further includes a protocol data unit PDU type field, the PDU type field in the frame structure is for carrying a predetermined value, and the predetermined value indicates that the frame structure is a management protocol frame structure. In this way, frame structures for implementing different purposes is distinguished through the PDU type field. For example, the frame structure further includes a command indicator, and the command indicator indicates that the frame structure corresponds to any one of the following message types: a read operation, a read response operation, a set operation, a set response operation, and an event report operation. For example, the frame structure further includes an event field, and the event field is for carrying alarm event information reported by the target optical head end to the controller.

This is merely an example description of fields included in the frame structure and constitutes no limitation. During a specific implementation, the fields included in the frame structure is defined or negotiated based on a service usage, an application scenario, or the like in the frame structure. Details are not described herein again.

In at least one embodiment, the transceiver is configured to: broadcast a discovery packet, where the discovery packet includes a destination identifier corresponding to the discovery packet; receive a discovery packet response sent by the target optical head end based on the destination identifier, where the discovery packet response includes a media access control MAC address of the target optical head end; and send the target optical head end identifier to the target optical head end based on the MAC address of the target optical head end.

In at least one embodiment, the processor is configured to: receive first version information from the target optical head end by using the transceiver, where the first version information indicates a version of each of the management protocols supported by the target optical head end; and determine, based on the first version information, the target management protocol from the management protocols supported by the target optical head end.

In at least one embodiment, the processor is configured to: determine, based on the first version information and second version information, the target management protocol from management protocols supported by both the controller and the optical head end, where the second version information indicates a version of each of management protocols supported by the controller. For example, the target management protocol is a management protocol of a latest version supported by both the controller and the target optical head end.

In at least one embodiment, the optical bus network includes a plurality of optical head ends, and the target optical head end is any one of the plurality of optical head ends, where the controller and the target optical head end are located in a same physical entity; or the controller is disposed independently of the plurality of optical head ends.

According to a fourth aspect, at least one embodiment provides a communication apparatus. The communication apparatus has a function of implementing the controller in the second aspect. This function is implemented by using hardware, or is implemented by executing corresponding software by hardware. The hardware or the software includes one or more units or modules corresponding to the foregoing function.

In at least one embodiment, the communication apparatus is an optical head end, or is a component that is used in an optical head end, for example, a chip, a chip system, or a circuit. For beneficial effects, refer to the description of the second aspect. Details are not described herein again. The communication apparatus includes a transceiver and a processor. The processor is configured to support the communication apparatus in performing a corresponding function of the optical head end shown above. The transceiver is configured to support communication between the communication apparatus and a controller or the like. The transceiver is an independent receiver, an independent transmitter, a transceiver integrating a transceiver function, or an interface circuit. Optionally, the communication apparatus further includes a memory. The memory is coupled to the processor, and the memory stores program instructions and data that are used for the communication apparatus.

The transceiver is configured to receive a target optical head end identifier from the controller, where the target optical head end identifier is sent by the controller in response to the controller discovering a target optical head end and is for identifying the target optical head end; and the processor is configured to transmit target information to the controller based on the target optical head end identifier and a target management protocol by using the transceiver, where the target information is used by the controller to manage the target optical head end and/or at least one optical terminal managed by the target optical head end, and the target management protocol is determined by the controller from management protocols supported by the target optical head end.

In at least one embodiment, the target management protocol is for defining a frame structure of a message that carries the target information, the frame structure includes a header field and a payload field, the target optical head end identifier is located in the header field, and the target information is located in the payload field.

In at least one embodiment, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

In at least one embodiment, the frame structure further includes a protocol data unit PDU type field, the PDU type field in the frame structure is for carrying a predetermined value, and the predetermined value indicates that the frame structure is a management protocol frame structure.

In at least one embodiment, the optical bus frame structure further includes a command indicator, and the command indicator indicates that the optical bus frame structure corresponds to any one of the following message types: a read operation, a read response operation, a set operation, a set response operation, and an event report operation.

In at least one embodiment, the frame structure further includes an event field, and the event field is for carrying alarm event information reported by the target optical head end to the controller.

In at least one embodiment, that the target optical head end receives a target optical head end identifier from the controller includes: The target optical head end receives a discovery packet from the controller, where the discovery packet includes a destination identifier corresponding to the discovery packet; the target optical head end sends a discovery packet response to the controller based on the destination identifier, where the discovery packet response includes a MAC address of the target optical head end; and the target optical head end receives the target optical head end identifier sent by the controller based on the MAC address of the target optical head end.

In at least one embodiment, the transceiver is further configured to: send first version information to the controller based on the target optical head end identifier, where the first version information indicates a version of each of the management protocols supported by the target optical head end.

In at least one embodiment, the target management protocol is a management protocol of a latest version supported by both the target optical head end and the controller.

In at least one embodiment, the target optical head end has a broadcast discovery state, a unicast discovery state, and a working state, where in response to the target optical head end being in the broadcast discovery state, the target optical head end is configured to receive the target optical head end identifier from the controller; after receiving the target optical head end identifier from the controller, the target optical head end is configured to communicate with the controller in the unicast discovery state based on the target optical head end identifier, so that the controller determines the target management protocol; and in response to the target optical head end being in the working state, the target optical head end is configured to transmit the target information to the controller based on the target optical head end identifier and the target management protocol.

In at least one embodiment, the optical bus network includes a plurality of optical head ends, and the target optical head end is any one of the plurality of optical head ends, where the controller and the target optical head end are located in a same physical entity; or the controller is disposed independently of the plurality of optical head ends.

According to a fifth aspect, at least one embodiment provides an optical bus network, including the communication apparatus according to the third aspect and at least one communication apparatus according to the fourth aspect. Further, optionally, the optical bus network further includes at least one optical terminal.

In at least one embodiment, the optical bus network is any one of the following passive optical networks PONs: a gigabit-capable passive optical network GPON, a 10 gigabit-capable passive optical network XG-PON; a 50 gigabit-capable passive optical network 50G-PON;

an Ethernet passive optical network EPON; a 10 Gb/s Ethernet passive optical network 10G-EPON; a code division multiple access passive optical network CDMA-PON; a frequency division multiplexing passive optical network FDM-PON; and a 10 gigabit-capable symmetric passive optical network XGS-PON.

According to a sixth aspect, at least one embodiment provides a computer-readable storage medium. The computer-readable storage medium stores a computer program or instructions. In response to the computer program or the instructions being executed by a communication apparatus, the communication apparatus is enabled to perform the method in the first aspect or at least one embodiment of the first aspect, or the communication apparatus is enabled to perform the method in the second aspect or at least one embodiment of the second aspect.

According to a seventh aspect, at least one embodiment provides a computer program product. The computer program product includes a computer program or instructions. In response to the computer program or the instructions being executed by a communication apparatus, the communication apparatus is enabled to perform the method in the first aspect or at least one embodiment of the first aspect, or the communication apparatus is enabled to perform the method in the second aspect or at least one embodiment of the second aspect.

BRIEF DESCRIPTION OF DRAWINGS

FIG. 8 is a schematic diagram of a payload field for carrying target information according to at least one embodiment;

DESCRIPTION OF EMBODIMENTS

The following describes embodiments herein in detail with reference to the accompanying drawings.

Figure 1:
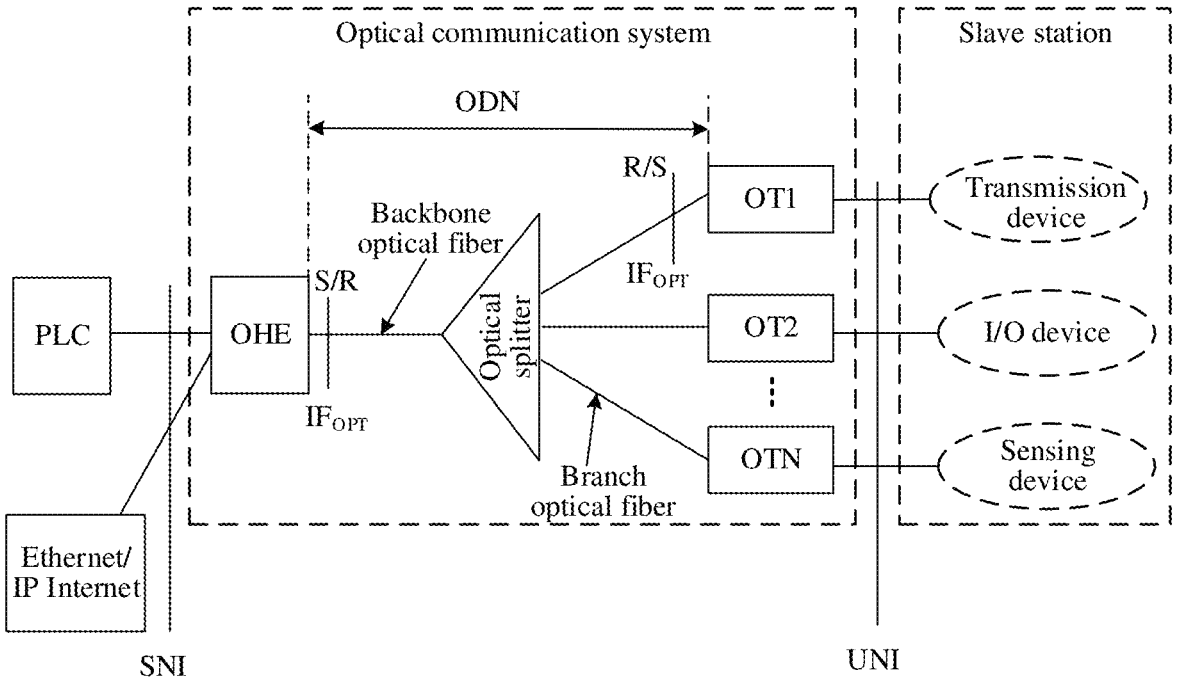
FIG. 1 is a schematic architectural diagram of an optical bus network according to at least one embodiment.

FIG. 1 is a schematic diagram of a system architecture of an optical bus network according to at least one embodiment. The optical bus network includes a controller and an optical communication system. Further, optionally, the optical bus network system further includes a field control device. The optical communication system includes: an optical head end (optical head end, OHE) on a central office side (or referred to as a central office), an optical distribution network (optical distribution network, ODN), and an optical terminal (optical terminal, OT) on a user side. The OHE is connected to the OT through the ODN. The ODN includes a backbone optical fiber, an optical splitter (splitter), and branch optical fibers. In FIG. 1, an example in which the optical communication system includes N oTs is used, and the N oTs are respectively an OT1, an OT2, . . . , and an OTN. The optical splitter is also referred to as an optical splitter, is an optical fiber tandem device having a plurality of input ends and a plurality of output ends, and is configured for optical signal coupling and distribution. The OHE is connected to the optical splitter through the backbone optical fiber. The optical splitter is connected to the oTs through the branch optical fibers. The field control device is, for example, a transmission device (such as a servo driver and a servo motor), a sensing device (such as a sensor), and an input/output (input/output, I/O) device. These field control devices are collectively referred to as secondary stations. The controller is, for example, a programmable logic controller (programmable logic controller, PCL). As a management center of the entire optical bus network system, the PLC is used to manage and maintain the OHE, the OT, and various types of field control devices. A system (which is also referred to as an industrial optical bus) including the PLC, the OHE, the ODN, the OT, and each secondary station is configured to provide a capability of "one network connected to each layer", and the industrial optical bus has a better delay and jitter, and supports more reliable redundancy protection networking. Further, optionally, an Ethernet/IP Internet device and the like accesses the optical bus network.

Forms and quantities of structures in the optical bus network system shown in FIG. 1 are merely used as examples, and do not constitute a limitation of at least one embodiment. In addition, the OHE, the OT, the optical splitter, and the quantity of ports included in the optical splitter in the optical communication system in FIG. 1 are merely examples. This is not limited in at least one embodiment.

The optical communication system herein is a PON system, where the PON system is, for example, a gigabit-capable passive optical network (gigabit-capable passive optical network, GPON) system, an Ethernet passive optical network (Ethernet passive optical network, EPON) system, a 10 Gb/s Ethernet passive optical network (10 Gb/s Ethernet passive optical network, 10G-EPON) system, a time and wavelength division multiplexing passive optical network (time and wavelength division multiplexing passive optical network, TWDM-PON), a 10 gigabit-capable passive optical network (10 gigabit-capable passive optical network, XG-PON) system, or a 10 gigabit-capable symmetric passive optical network (10 gigabit-capable symmetric passive optical network, XGS-PON) system. With the emergence of a future evolved new technology, a rate of the PON system is increased to 25 Gbps, 50 Gbps, or even 100 Gbps. Therefore, the optical communication system is alternatively a PON system with a higher transmission rate. This is not limited in at least one embodiment.

In at least one embodiment, the PON system is a PON system that supports a single wavelength, or is a PON system that supports a plurality of wavelengths.

The system architecture described in at least one embodiment is intended to describe the technical solutions more clearly, and does not constitute a limitation on the technical solutions provided in at least one embodiment. A person of ordinary skill in the art knows that, with the evolution of the system architecture and the emergence of a new service scenario, the technical solutions provided in at least one embodiment are also applicable to the following similar technical problems.

Based on FIG. 1, a transmission direction in which data or an optical signal carrying data is transmitted from the OHE to the OT is referred to as a downlink direction. A direction in which data or an optical signal carrying data is transmitted from the OT to the OHE is referred to as an uplink direction. The OHE transmits the optical signal to the OT in a broadcast manner or in a unicast manner. The OT transmits the optical signal to the OHE in a unicast manner. In the uplink direction, the PON system is a multipoint to point (multipoint to point, MP2P) system; and in the downlink direction, the PON system is a point to multipoint (point to multipoint, P2MP) system.

An example in which the optical bus network uses a point to multipoint (point to multipoint, P2MP) structure is used. The optical bus network is a single-fiber bidirectional access network, and a topology structure of the optical bus network is a tree structure. The optical bus network is also referred to as a P2MP communication system. In the optical bus network, an optical bus system includes the OHE on the central office side, the OT on the user side, and the ODN is a single-fiber bidirectional system. The PLC communicates with the optical head end through a service node interface (service node interface, SNI), and the optical terminal communicates with a secondary station managed by the optical terminal through a user network interface (user network interface, UNI). The ODN includes an optical fiber point after an optical connection point (that is, an optical connector or a splicing point) of an optical head end (downlink)/optical terminal (uplink); and an optical fiber point before an optical connection point (that is, an optical connector or a splicing point) of an optical terminal (downlink)/optical head end (uplink); and interfaces at reference points R/S and S/R support all protocol units used for transmission between the optical head end and the optical terminal. In the downlink direction (the direction from the OHE to the OT), a signal sent by the optical head end reaches each optical terminal through a 1: n passive optical splitter (or cascading of several splitters). In the uplink direction (the direction from the OT to the OHE), a signal sent by any optical terminal reaches only the optical head end, and does not reach another optical terminal. To avoid data conflicts and improve network utilization, a plurality of access manners such as time division multiplexing access (time division multiple access, TMDA) is used in the uplink direction, and data of each OT is arbitrated. The optical distribution network provides one or more optical channels between one optical head end and one or more optical terminals, and each optical channel is limited within a specific wavelength window.

Figure 2:
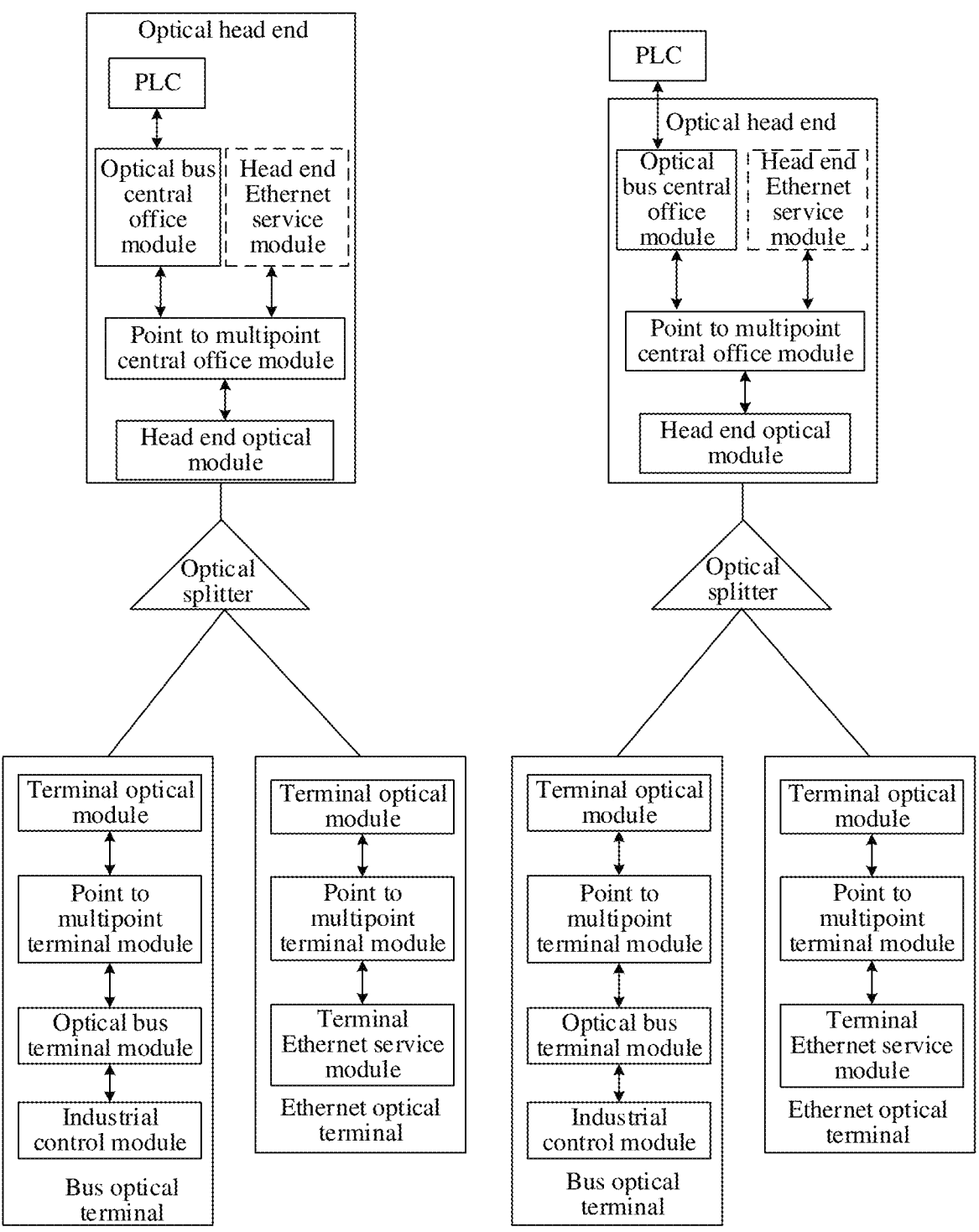
FIG. 2 is an example of network elements/modules in an optical bus network according to at least one embodiment.

Refer to FIG. 2, the following describes functions of network elements/modules included in each network node of the optical bus network in at least one embodiment by using an example in which the controller is a PLC.

As shown in FIG. 2, during a specific implementation, the optical head end and the PLC is deployed in an integrated system, for example, both are deployed in the optical head end. In this case, the PLC is specifically implemented as a PLC (vPLC) module, and an interface between the optical head end and the PLC module is an internal software transceiver interface. Alternatively, the PLC and the optical head end is separately deployed, and the PLC and the optical head end are connected by using an external interface. In this case, the SNI interface of the optical bus system is one of an Ethernet interface (for example, an FE, a GE, or a 10GE) or a PCIE interface. Optionally, the UNI interface is one or more of an Ethernet interface (for example, an FE, a GE, or a 10GE), an SPI interface, or a servo motor monitoring and driving interface (for example, an AD, a GPIO, an RS422, or a PWM control). This is not limited in at least one embodiment.

The optical head end is mainly configured to carry and multiplex a bus service/an Ethernet service on a P2MP communication system. The optical head end includes, for example, a PLC (vPLC) module (optional), an optical bus central office module, a central office Ethernet service module (optional), a point to multipoint (P2MP) central office module, and a head end optical module. The PLC (vPLC) module is configured to complete programming and management of a plurality of industrial network control modules (for example, the optical head end and an optical terminal managed by the optical head end), and implements, for example, some computing functions of an industrial control module. The optical bus central office module is configured to carry an optical bus service, and service data of the optical bus central office module is data of a control machine or a query/collection machine (for example, the PLC module). The central office Ethernet service module is configured to carry a central office Ethernet service. An external interface provided by the module is an Ethernet interface, such as an FE, a GE, and a 10GE interface. The P2MP central office module is configured to complete link layer communication of a plurality of optical terminals in a P2MP network. The head end optical module is configured to send an optical signal at the optical head end and receive an optical signal at the optical terminal. The optical signal herein is a single-wavelength optical signal or a multiple-wavelength optical signal. This is not limited in at least one embodiment.

The optical splitter is mainly configured to implement a point to multipoint optical splitting/combination function. In at least one embodiment, the optical splitter includes one level or a plurality of levels, or is an optical fiber with an equal ratio or an optical fiber with an unequal ratio. This is not limited in at least one embodiment.

Each optical terminal is mainly configured to implement a function of obtaining industrial control information or Ethernet information on a P2MP system. According to a service type provided by the optical terminal, the optical terminal included in the optical bus network is classified into an optical bus terminal and an Ethernet optical terminal. The bus optical terminal and the Ethernet optical terminal includes same modules, for example, a terminal optical module and a point to multipoint (P2MP) terminal module. Alternatively, the bus optical terminal and the Ethernet optical terminal includes a corresponding module configured to support a service type provided by the bus optical terminal and the Ethernet optical terminal. For example, the bus optical terminal includes an optical bus terminal module and an industrial control module, and the Ethernet optical terminal includes a terminal Ethernet service module. In the optical terminal, the terminal optical module is configured to receive an optical signal at the optical head end and send an optical signal at the optical terminal. The P2MP terminal module is configured to complete link layer communication of a plurality of optical terminals in a P2MP network. The optical bus terminal module is configured to complete parsing of optical bus data, and perform read and write operations on the industrial control module. The industrial control module includes a module for controlling an industrial device/IO. The industrial device is a sensor, a server I/O device, or the like. The terminal Ethernet service module (optional) is mainly configured to carry an optical terminal Ethernet service. An external interface provided by the terminal Ethernet service module is an Ethernet interface, such as an FE, a GE, or a 10GE interface.

Optical fibers are used to connect the optical head end and the optical splitter, and the optical splitter and the optical terminal. In at least one embodiment, the optical fiber is a common optical fiber, or is an optical-electrical integrated optical fiber, and supplies power to the optical terminal.

In at least one embodiment, the optical bus networks shown in FIG. 1 and FIG. 2 are configured to provide a comprehensive carrying capability, and carries an original industrial bus service, or carries a common Ethernet/IP service. The following describes a protocol stack architecture of the optical bus network with reference to FIG. 3.

Figure 3:
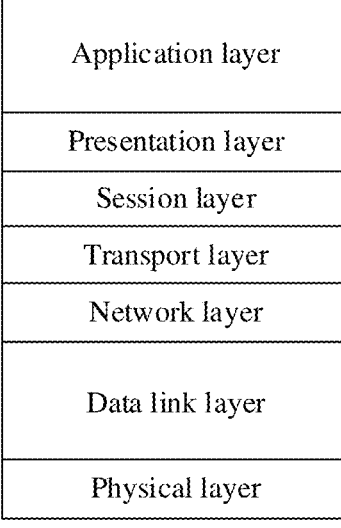
FIG. 3 is a protocol stack architecture of an optical bus network according to at least one embodiment.
Figure 3:
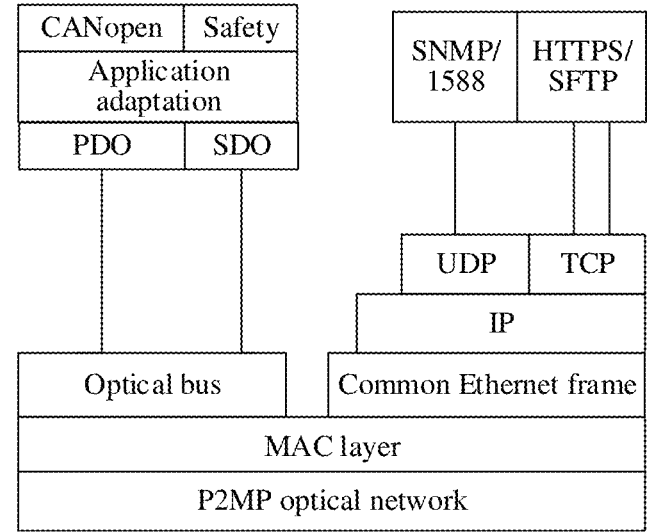

As shown in FIG. 3, refer to a seven-layer protocol of an open system interconnection (open system interconnection, OSI) model. A network model of the optical bus network includes protocol layers respectively corresponding to a physical layer, a data link layer, a network layer, a transport layer, a session layer (optional), a presentation layer (optional), and an application layer.

For example, the physical layer of the optical bus network includes a P2MP optical network. In response to the optical bus system being a single-fiber bidirectional system, different wavelengths should be used in an uplink direction and a downlink direction respectively.

The data link layer includes a media access control (media access control, MAC) layer, an optical bus (OptiXBus) link layer, and a common Ethernet/IP service link layer. The MAC layer protocol is located in the lower half part of the data link layer in the OSI seven-layer protocol, and is mainly responsible for controlling and linking a physical medium of the physical layer. In response to data being sent, the MAC protocol determines whether the data is sent. In response to the data being sent, some control information is added to the data, and finally the data and the control information are sent to the physical layer in a specified frame structure. In response to data being received, the MAC protocol first determines whether a transmission error occurs in the input information, and in response to no transmission error occurring, control information is removed and the data is sent to the optical bus link layer. The optical bus (OptiXBus) link layer and the common Ethernet/IP service link layer are located in the upper half part of the data link layer. The two link layers need to be isolated at the data link layer. The common Ethernet/IP service link layer should comply with a definition of the Institute of Electrical and Electronics Engineers (Institute of Electrical and Electronics Engineers, IEEE) 802.3 and supports an IP protocol at the network layer, a user data protocol (user datagram protocol, UDP) and a transmission control protocol (transmission control protocol, TCP) at the transport layer, and an industrial bus application protocol at the application layer, such as SNMP/1588 and HTTPS/SFTP. The optical bus link layer is extended and defined based on an Ethernet according to a usage of an industrial bus, and supports payloads such as process data object (process data object, PDO) data, service data object (service data object, SDO) data, and management channel data from the application layer. The application layer of the optical bus network further includes an application adaptation layer and an industrial control protocol for supporting a PDO, an SDO, and the like, such as a CANopen protocol and a safety (safety) protocol.

This is merely an example of the protocol stack architecture applicable to the optical bus network in at least one embodiment, and constitutes no limitation. During a specific implementation, a protocol stack architecture of an optical bus network is further set based on an application usage, an application scenario, or the like. Details are not described herein again.

Because a service of the optical bus network mainly depends on the data link layer, for ease of understanding, the following describes a link layer frame structure of the optical bus network by using an example with reference to Table 1.

As shown in Table 1, the link layer of the optical bus network is based on a standard Ethernet, and a corresponding link layer frame structure includes a related field of an Ethernet frame, and is further classified in terms of carried content. In response to an optical bus data being transmitted between PLCs, or optical bus data being transmitted to an IP Internet, a virtual local area network (virtual local area network, VLAN) header or an IP header is further added to a packet header. This is not limited in at least one embodiment.

14

TABLE 1

| Field Name | Field Length (Bytes) | Field definition |
|---|---|---|
| DA | 6 | A destination MAC address |
| SA | 6 | A source MAC address |
| EtherType | 2 | An Ethernet type |
| PDUn | 12-1978 | A protocol data unit, where n is an integer greater than or equal to 0. |
| Timestamp (Option) | 4 | A timestamp (optional), where a timestamp in an uplink packet indicates a time at which an operation is performed on PDO data, and a timestamp in a downlink packet indicates a periodicity starting time of PDO data. A unit of the timestamp is 6.4 ns, indicating an offset value within current 10 s, and if a time exceeds 10 s, an offset value within the time exceeding 10 s is supplemented by software. Whether this field is carried is identified by a t_ind field in the PDU. |
| FCS | 4 | A frame check sequence |

A unique MAC address is allocated to each network node in the optical bus network based on the IEEE 802.3 standard, so as to distinguish different nodes. For example, the MAC address is 48 bits, where most significant 24 bits is a vendor identifier, and least significant 24 bits is allocated by the vendor. In addition, each node has a unique MAC address. In the optical bus link layer frame structure, content carried in the source address (source address, SA) field and the destination address (destination address, DA) field respectively indicates addresses of a source point sending the frame structure and a destination of the frame structure. The Ethernet type (EtherType) indicates an upper-layer protocol type. The frame check sequence (frame check sequence, FCS) is checked by using a cyclic redundancy check (cyclic redundancy check, CPC) code-32.

As shown in Table 1, a total length of a frame structure supported by an optical terminal and an optical bus is not less than 2000 bytes. The PDU is a payload unit of the optical bus, and a maximum length that is carried by the PDU is 1978 bytes. Definitions of data formats of the PDU is shown in Table 2.

TABLE 2

| | Bit offset | | | | | | | |
|---|---|---|---|---|---|---|---|---|
| Byte | 7 | 6 | 5 | 4 | 3 | 2 | 1 | 0 |
| — | Type (type) | | | | cmd | | | |
| 1 | Destination (Destination) identifier (identifier, ID) | | | | | | | |
| 2 | | | | | | | | |
| 3 | Source (Source) ID | | | | | | | |
| 4 | | | | | | | | |
| 5 | Offset (offset) 1 | | | | | | | |
| 6 | Offset (offset) 0 | | | | len1 | | | |
| 7 | len0 | | | | | | | |
| 8 | sn | | | | | | | |
| 9 | pri | | r | t_ind | | eop_ind | r | r |
| 10 | Control word (ctrlword) (downlink)/Event (event) (8b) + error code (err_code) | | | | | | | |
| 11 | (8b) (uplink) | | | | | | | |
| 12 to n | Payload | | | | | | | |
| n + 1 | BIP-8 | | | | | | | |

For example, in the PDU data formats shown in Table 2, meanings of the fields is shown in Table 3.

TABLE 3

| Field | Meaning |
| --- | --- |
| Type (type) | 0: PDO periodicity real-time data; |
| | 1: SDO random access data; |
| | 2: Management channel; |
| | 3: Safety data; |
| | 3 to 15: reserved; |
| Command indicator (cmd) | When a value of the type is 0 or 1, the cmd is defined as follows: |
| | 0: NOP, which is ignored by a secondary station and may be used in a pure data transfer mode; |
| | 1: RD (read operation); |
| | 2: WR (write operation); |
| | 3: RW (read/write operation); |
| | 4: BWR (broadcast write operation); |
| | 5: Loopback test (loopback test) |
| | Other fields are reserved. |
| | When the value of the type is 2 (management channel), the cmd is defined as follows: |
| | 0: NOP, which is ignored and meaningless; |
| | 1: get (read operation); |
| | 2: get response (read response operation); |
| | 3: set (set operation); |
| | 4: set response (set response operation); |
| | 5: event (event) |
| | Other fields are reserved. |
| Destination (Destination) ID | An ID of a destination secondary station, indicating a number of the destination secondary station, where a number allocation manner is not limited. |
| Source (Source) ID | An ID of a source secondary station, indicating a number of the source secondary station, where a number allocation manner is not limited. |
| Offset (offset) | A logical starting offset address in the secondary station, and multi-address segment mapping in the secondary station is supported. If all addresses need to be operated, the offset address is 0. The management channel is fixed at 0. |
| len | A length of payload data of the PDU. |
| Sn | The PLC master station encodes a sequence number SN of a sent packet in ascending order. The secondary station does not modify the SN and fills a same SN' value in a response packet. |
| Pri | A priority of a PDU packet. This field is valid for SDO data, and values 7 to 0 indicate priorities in descending order. For non-SDO data, this field is set to 0. |
| t_ind | This field indicates whether the first PDU is valid and whether a packet tail carries a Timestamp field (indicating a SYNC time of an optical terminal in an uplink direction), where a value 1 indicates that the first PDU is valid and the packet tail carries the Timestamp field. |
| eop_ind | This field indicates whether the PDU is the last PDU of the packet, where a value 1 indicates that the PDU is the last PDU of the packet. |
| Event (event) | This field indicates whether there is reporting of a secondary station event, whether there is data to be sent, or whether there is another interrupt event. This field is reported in a bit mask manner. |
| | 0x0: There is no data to be sent and no interrupt event reported. |
| | Bit0 (least significant bit): 1—There is data to be sent, and 0—There is no data to be sent. |
| | Bit1: 1—The secondary station is powered off, and 0—The secondary station is normal. |
| | Bit2: 1—The secondary station is offline, and 0—The secondary station is normal. |
| | Other bits are reserved. |
| Control word (Ctrlword)/ Error code (err_code) | A length of the control word/response error code is 8 bits. For the master station, this field is set to 0. For the secondary station, after the secondary station checks that the data is correct and responds to the data, this field is set to 0; otherwise, this field is set to a specific error type. Definitions of the error code: |
| | 0: Success; |
| | 1: Parameter error; |
| | 2: Processing error; |

TABLE 3-continued

| Field | Meaning |
| --- | --- |
| | 3: A current state of the secondary station cannot process this message; |
| | 4: The secondary station is offline. |
| | Error codes 128 to 255 are defined by vendors. |
| | Other error types are reserved. |
| Payload (Payload) | A payload, and a length of the PDO data needs be supplemented as an integer multiple of 4 bytes. |
| r | A reserved field. For a transmit end, this field should be filled with 0, and for a receive end, this field should be ignored. |
| BIP-8 | A bit interleaved parity (bit interleaved parity) bit, used to perform BIP-8 check on the entire PDU field |

During a specific implementation, the PDU carries payloads such as PDO data, SDO data, and management channel data. The PDO data, the SDO data, and the management channel data are carried in different frame structures, and is distinguished by using a PDU type. To improve transmission efficiency, one frame structure also supports carrying of a plurality of PDUs. In addition, the frame structure supports sending of a broadcast message by using a destination secondary station ID as a broadcast secondary station ID. For a secondary station, periodicity data with different periodicities is supported, and different periodicity data is operated by using an offset address. In response to a link layer data frame being transmitted on a line, a specified transmission sequence is from top to bottom of each byte, and from a least significant bit to a most significant bit in each byte, which is not described herein again.

At least one embodiment provides a communication method. The communication method is implemented by the foregoing optical bus network, for example, implemented by a controller (for example, a PLC) and each optical head end (referred to as a target optical head end in the following for ease of differentiation) through collaboration. For ease of understanding, the following uses the optical bus networks shown in FIG. 1 and FIG. 2 as examples to describe the communication method in at least one embodiment with reference to the accompanying drawings and embodiments.

In at least one embodiment, to identify, manage, and maintain different network nodes in the optical bus network, any network node needs to have an ID of the network node. The controller is used as a management center of the entire optical bus network, and an ID of the controller is preset. In a specific implementation, in response to there being a plurality of controllers and the plurality of controllers communicating with each other, the ID of each controller is manually configured by an operator, or is allocated by a higher-layer controller. This is not limited in at least one embodiment. The controller discovers each optical head end, and allocates a corresponding target optical head end identifier to any discovered target optical head end, so as to subsequently manage and maintain the target optical head end based on the target optical head end identifier. In at least one embodiment, the target optical head end identifier is directly allocated by the controller, or is manually configured by an operator, or is allocated by another device. This is not limited in at least one embodiment. For ease of description, the following describes the communication solution of at least one embodiment by using an example in which the controller sends the target optical head end identifier to the target optical head end, and the manner is considered as a manner in which the controller allocates the target optical head end identifier to the target optical head end. This is not construed as any limitation on the communication solution of at least one embodiment.

The controller allocates an ID to each optical head end in a plurality of implementations. This is not limited in at least one embodiment. In a simple example, an allocation manner that is used by the controller is to use a class C address, and allocate IDs that have a same $12^{th}$ bit as IDs of the controller and each optical head end. Optionally, for a secondary station connected to any optical terminal, the optical terminal allocates an identifier to a corresponding secondary station in response to discovering the secondary station, and the optical terminal also reports, to the controller, the identifier allocated to the managed secondary station. Details are not described herein again.

Figure 4:
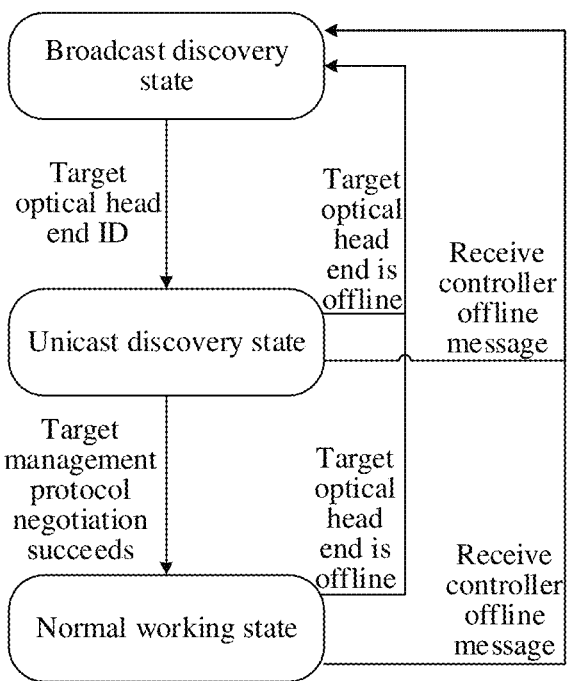
FIG. 4 is a schematic diagram of state transition of a target optical head end according to at least one embodiment.

As shown in FIG. 4, before the controller discovers the target optical head end and until the target optical head end works normally, the target optical head end needs to experience the following three states: a broadcast discovery state, a unicast discovery state, and a normal working state.

(1) Broadcast discovery state: In this state, the controller needs to complete a broadcast discovery process of the target optical head end, and allocate (that is, send) an ID to the target optical head end. A destination ID of a broadcast discovery packet sent by the controller is 0xDFFF, and a source ID of a response message of the target optical head end is 0xDFFF. The controller allocates the target optical head end identifier to the target optical head end based on a MAC address carried in the response message of the target optical head end. After receiving the target optical head end identifier allocated by the controller to the target optical head end, the target optical head end transits from the broadcast discovery state to the unicast discovery state.

(2) Unicast discovery state: In this state, the controller and the target optical head end performs management protocol version negotiation. In this negotiation process, the controller and the target optical head end performs unicast communication by using the target optical head end identifier ID, to complete management protocol negotiation. After the protocol negotiation is completed, the target optical head end transits from the unicast discovery state to the normal working state. A target management protocol negotiated by the controller and the target optical head end is for defining a frame structure of a message for communication between the controller and the target optical head end, so that the controller manages and maintains the target optical head end and/or at least one optical terminal managed by the target optical head end.

(3) Normal working state: In this state, the controller operates, manage, and maintain the target optical head end and/or the at least one optical terminal managed by the target optical head end.

In response to the controller losing contact with the target optical head end (for example, the target optical head end is offline), or the target optical head end receiving a controller offline message, the state of the target optical head end returns to the broadcast discovery state.

Figure 5:
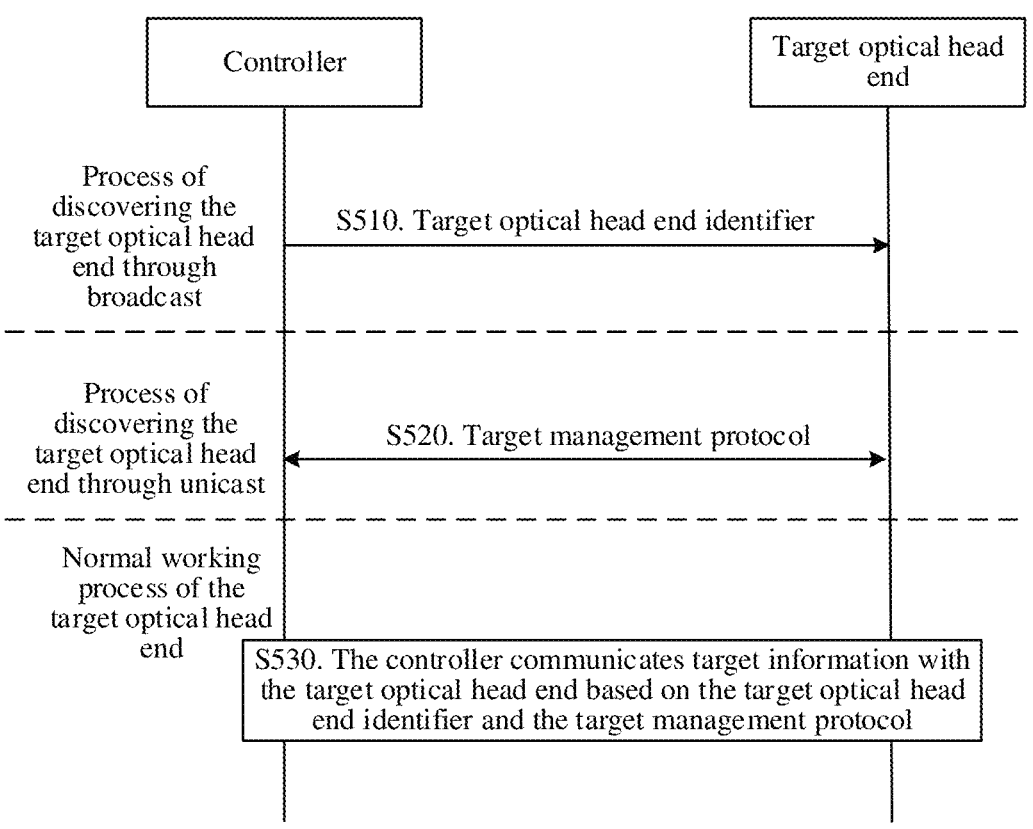
FIG. 5 is a schematic method flowchart of a communication method according to at least one embodiment.

For ease of understanding, the following describes specific implementation details of the communication method with reference to FIG. 5 by using the controller and the target optical head end as an example.

As shown in FIG. 5, the communication method includes the following steps.

Process of Discovering the Target Optical Head End Through Broadcast

S510. The controller sends a target optical head end identifier to the target optical head end in response to discovering the target optical head end, where the target optical head end identifier is for identifying the target optical head end. Correspondingly, the target optical head end receives the target optical head end identifier from the controller.

Figure 6:
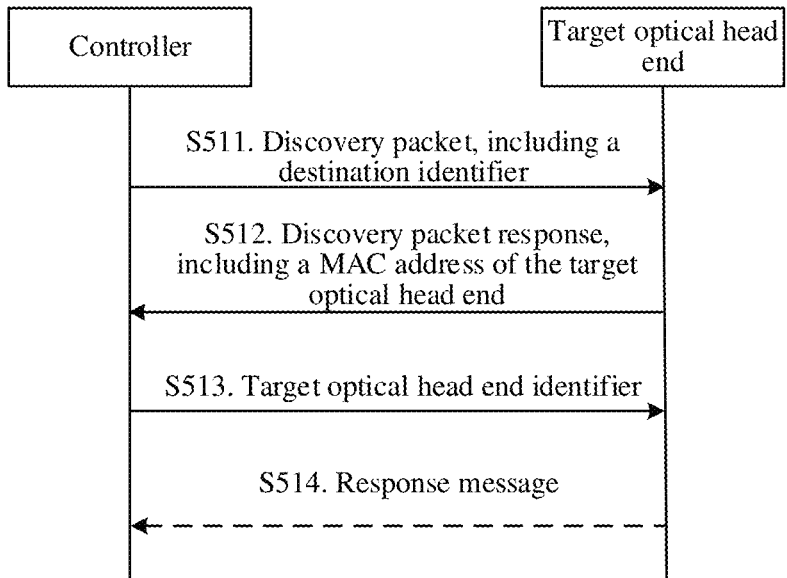
FIG. 6 is a schematic method flowchart of a communication method according to at least one embodiment.

Specifically, as shown in FIG. 6, S510 includes the following steps:

S511. The controller broadcasts a discovery packet, where the discovery packet includes a destination identifier corresponding to the discovery packet, for example, 0xDFFF.

S512. The target optical head end receives the discovery packet from the controller, and sends a response message, which is referred to as a discovery packet response, to the controller based on the destination identifier included in the discovery packet. A source ID of the discovery packet response is 0xDFFF, and the discovery packet response indicates that the target optical head end has received the discovery packet broadcast by the controller. In addition, the discovery packet response includes a MAC address of the target optical head end.

S513. The controller receives the discovery packet response sent by the target optical head end based on the destination identifier, and sends the target optical head end identifier to the target optical head end based on the MAC address of the target optical head end. During an implementation, the controller encapsulates the target optical head end identifier allocated to the target optical head end and the MAC address reported by the target optical head end into an optical head end ID allocation message, and send the optical head end ID allocation message to the target optical head end, to notify the target optical head end that discovery has been completed.

Correspondingly, the target optical head end receives the target optical head end identifier from the controller. After receiving the optical head end ID allocation message from the PLC, the target optical head end obtains, by comparing the MAC address included in the message with the MAC address of the target optical head end, the target optical head end identifier allocated by the controller to the target optical head end. In this case, the target optical head end has obtained the target optical head end Identifier allocated by the controller to the target optical head end. The target optical head end transits from the broadcast discovery state to the unicast discovery state, and performs unicast communication with the controller based on the target optical head end identifier.

Optionally, during an implementation, in response to the target optical head end successfully receiving the optical head end ID allocation message, the target optical head end further sends a response message to the controller in S514, to indicate that the target optical head end has received the optical head end ID allocation message, and learns of the target optical head end identifier obtained through allocation. Alternatively, in response to the target optical head end failing to receive the optical head end ID allocation message, the target optical head end further feeds back an error prompt to the controller in S514, so that the controller sends a corresponding target optical head end identifier to the target optical head end again. Alternatively, during an implementation, after sending the optical head end ID allocation message to the target optical head end, the controller determines by default that the optical head end ID allocation message is successfully sent in response to no response message being received from the target optical head end within a preset time period. In this case, the controller determines by default that the target optical head end discovery process has been completed, and performs a subsequent protocol negotiation process.

Process of Discovering the Target Optical Head End Through Unicast

S520. The controller determines a target management protocol from management protocols supported by the target optical head end.

Figure 7:
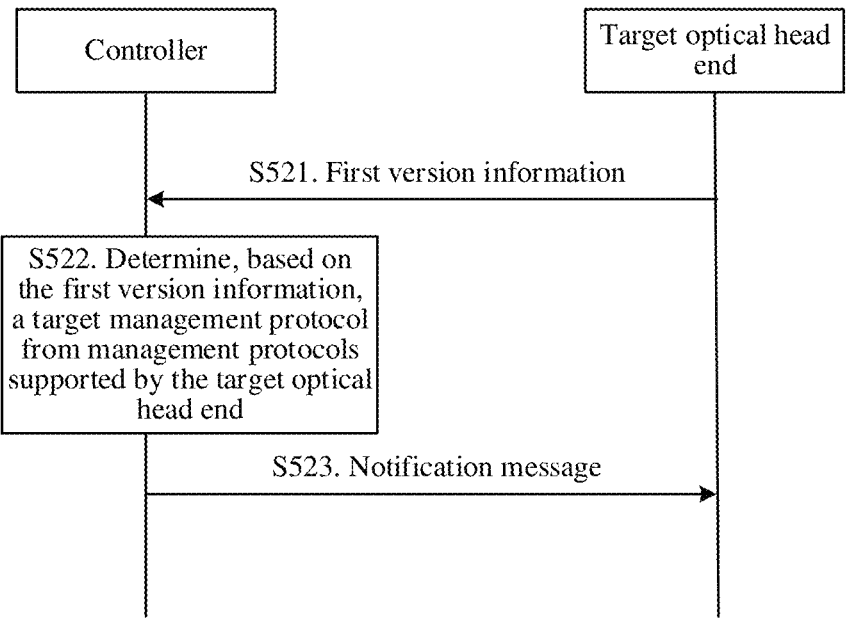
FIG. 7 is a schematic method flowchart of a communication method according to at least one embodiment.

Specifically, as shown in FIG. 7, S520 includes the following steps:

S521. The target optical head end sends first version information to the controller based on the target optical head end identifier, and correspondingly, the controller receives the first version information from the target optical head end. In at least one embodiment, the first version information indicates a version of each of the management protocols supported by the target optical head end.

During an implementation, the first version information is actively reported by the target optical head end after the target optical head end obtains the target optical head end identifier allocated by the controller to the target optical head end; or the first version information is sent by the target optical head end in response to a query message from the controller. The query message is for querying the version of each of the management protocols supported by the target optical head end, and the query message includes the target optical head end identifier previously allocated to the target optical head end. Alternatively, in an implementation, to reduce message exchange overheads, in response to sending the target optical head end identifier to the target optical head end, the controller includes indication information in the optical head end ID allocation message carrying the target optical head end identifier. The indication information indicates the target optical head end to report the version of each of the management protocols supported by the target optical head end. A transmission triggering manner of the first version information is not limited in at least one embodiment.

S522. The controller determines, based on the first version information, the target management protocol from the management protocols supported by the target optical head end.

Specifically, the controller obtains second version information, where the second version information indicates a version of each of management protocols supported by the controller. Then, the controller determines, based on the first version information and the second version information, the target management protocol from management protocols supported by both the controller and the optical head end. For example, the target management protocol is a management protocol of a latest version supported by both the target optical head end and the controller. The second version information is locally stored in the controller, or the second version information is obtained by the controller from a cloud or another device. This is not limited in at least one embodiment.

S523. The controller locally caches version information of the target management protocol, and send a notification message to the target optical head end, where the notification message indicates a version of the target management protocol. Correspondingly, the target optical head end receives the notification message from the controller, and learns of the target management protocol determined by both parties through negotiation.

In this case, the controller and the target optical head end complete a basic protocol negotiation process. Subsequently, the controller and the target optical head end communicates with each other based on the target management protocol. In addition, the controller manages and maintain the target optical head end.

Normal Working Process of the Target Optical Head End

S530. The controller communicates target information with the target optical head end based on the target optical head end identifier and the target management protocol, where the target information is used by the controller to manage the target optical head end and/or at least one optical terminal managed by the target optical head end.

For example, in S530, the controller performs operation, maintenance and management on the target optical head end and/or the at least one optical terminal managed by the target optical head end, including but not limited to: querying various statistical information, device information, version information, and the like of the optical head end; configuring a PDO parameter of a secondary station of any optical terminal, an addressing manner, and the like; performing operations such as device software updating and device operating (resetting or de-registration); and receiving an alarm event (event) reported by the optical head end to perform optical path diagnosis and fault locating.

During a specific implementation, the controller indicates the at least one optical terminal managed by the target optical head end. Before S530 is implemented, the controller sends optical terminal authentication information to the target optical head end. Correspondingly, the target optical head end receives the optical terminal authentication information from the controller, establishes a connection to the at least one optical terminal, and manages the at least one optical terminal. Then, the target optical head end sends a response message to the controller, where the response message indicates a result of processing the optical terminal authentication information by the target optical head end, so that the controller learns of the at least one optical terminal managed by the optical head end, thereby facilitating subsequent management and maintenance on the at least one optical terminal. In addition, any management channel information between the controller and the target optical head end is used as a handshake message. The handshake between the controller and the target optical head end is ensured by the controller, and a handshake timeout time is set to no more than 1 second(s). Certainly, during an implementation, the handshake timeout time is alternatively configured to another value based on an application scenario, a service usage, or the like. Details are not described herein again.

In the foregoing communication method, the controller manages and maintain, based on configuration data and/or a configuration message, the target optical head end and the optical terminal managed by the target optical head end. Transmission of the configuration data and/or the configuration message between the two parties is a data synchronization manner. In at least one embodiment, data synchronization between the controller and the target optical head end supports two manners: (1) Each time the controller configures the target optical head end, the controller delivers all configuration data to the target optical head end, and the target optical head end does not need to store the configuration data. (2) After delivering the configuration data to the target optical head end, the controller delivers the configuration message to the target optical head end. The target optical head end needs to store the configuration data, and the controller ensures data synchronization between the two parties by obtaining data of the target optical head end. Data synchronization between the controller and the target optical head end is not limited in at least one embodiment. Certainly, in consideration of overall performance of the optical bus network, the foregoing manner (1) is selected as the data synchronization manner between the controller and the target optical head end.

In at least one embodiment, communication between the controller and the target optical head end is implemented through interaction based on the frame structure defined in Table 1 to Table 3. The controller and the target optical head end exchange a management channel-based management packet (or referred to as a management channel message or an operation, administration and maintenance (operation, administration and maintenance, OAM) message) to implement the communication method described above with reference to FIG. 4 to FIG. 7.

As shown in Table 2 and Table 3 above, frame structures for implementing different purposes is distinguished through the PDU type (type). For example, in response to a value of the PDU type field being 2, a transmitted frame structure is a management packet of a management channel. In response to the value of the PDU type field being 0, the transmitted frame structure is for transmitting PDO data. For a specific definition, refer to the foregoing detailed descriptions in Table 2 and Table 3. Details are not described herein again.

Because embodiments described herein mainly focuses on a management mechanism implemented by the controller for the target optical head end and/or the at least one optical terminal managed by the target optical head end, the following describes attributes related to the management packet exchanged between the controller and the target optical head end in at least one embodiment with reference to the accompanying drawings and embodiments. In at least one embodiment, the management packet is a packet for implementing a management function, including but not limited to a packet that is delivered by the controller to the target optical head end and that is for carrying configuration data, a configuration parameter, or the like, or a packet that is delivered by the controller to the target optical head end and that indicates the target optical head end to report related data that is used for management, or a packet that is reported by the target optical head end to the controller and that is used for management.

For example, in at least one embodiment, the target management protocol is for defining the frame structure shown in Table 1 to Table 3, and the management packet uses the frame structure shown in Table 1 to Table 3. As shown in FIG. 8, target information for implementing a management function is carried in a payload (payload) field in a PDU in the frame structure.

Specifically, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content. Between the controller and the target optical head end, information that needs to be transmitted is encapsulated in the foregoing frame structure based on a management specification, and transmitted to a peer end. The peer device parses the received frame structure, and obtain the target information from the frame structure, so that the controller manages, based on the target information, the target optical head end and/or the at least one optical terminal managed by the target optical head end.

In at least one embodiment, in at least one TLV structure included in one management channel message, operations of a same type for different objects is completed by using the type field in each TLV structure. For example, a type ID (type ID) range is allocated as follows: 0x0 to 0xFFF are operations related to the optical head end; 0x1000 to 0x1FFF are operations related to the optical terminal/secondary station; 0xF000 to 0xFFF are extended fields defined by a vendor; and other fields are reserved temporarily. The length of the object content ranges from 0 byte to 1024 bytes or is another value range. For example, in response to the message type corresponding to a read (get) operation, a length of a content area is 0; and in response to the message type corresponding to a set (set) operation, the length of the content area is 0. A plurality of TLV structures that is encapsulated in one management channel message correspond to a same operation type. For example, messages for querying a plurality of pieces of object content is encapsulated in one management channel message, and messages for configuring content of a plurality of objects is encapsulated in one management channel message. The management channel packet distinguishes an operation based on the command indicator cmd. The event field is used for reporting an event, including but not limited to reporting of a secondary station event, whether there is data to be sent, or whether there is another interrupt event. The event field is reported in a bit mask manner. For a specific definition, refer to the foregoing detailed descriptions in Table 2 and Table 3. Details are not described herein again.

For ease of understanding, the following uses an example in which the managed object is an optical head end to describe attribute definitions of at least one extended TLV structure in the OAM message with reference to Table 4 to Table 6.

TABLE 4

| Attribute Name | Description | Managed object | Type ID | Whether optional or not | GetSet |
|---|---|---|---|---|---|
| OHE device info | Device information of the optical head end | OHE | 0 × 0 | Mandatory | 0 |
| OHE ID | ID allocation of the optical head end | OHE | 0 × 1 | Mandatory | 0  0 |
| Bus version | Version information of an optical bus protocol | OHE | 0 × 2 | Mandatory | 0 |

In response to values of the Type ID field being different, the Type ID field indicates different operations on the managed object (for example, an OHE). For example, in response to the value of the Type ID field being 0x0, the Type ID field indicates that the transmitted management packet indicates device information of the optical head end; in response to the value of the Type ID field being 0x1, the Type ID field indicates that the transmitted management packet indicates ID allocation of the optical head end; and in response to the value of the Type ID field being 0x2, the Type ID field indicates that the transmitted management packet indicates version information of an optical bus protocol. "Whether optional or not" indicates a mandatory operation and/or an optional operation on the managed object.

Specifically, in Table 4, (1) The OHE device info is for defining related device information of the optical head end.

An attribute definition of the OHE device info is shown in the following Table 5:

TABLE 5

| Quantity of bytes | Field | Description |
|---|---|---|
| 2 | Type ID | 0x0 |
| 2 | Length | A value is 58. |
| 4 | Vendor ID | This field indicates a vendor ID of the optical head end, which is encoded in an ASCII mode. If a model of the optical head end is less than 4 bytes, the value is filled in the least significant bit of this field based on least significant bit alignment, and 'NULL' of ASCII is filled in front of the value. |
| 6 | MAC address | A MAC address of the optical head end is used as a unique identifier of the ID of the optical head end. |
| 16 | OHE Model | A model of the optical head end, which is encoded in an ASCII mode. If the model is shorter than 16 bytes, the value is placed in the least significant bit of this field based on least significant bit alignment. |
| 8 | HardwareVersion | A hardware version number of the optical head end device, which should be encoded in an ASCII mode. If the version number is shorter than 8 bytes, the value is placed in the least significant bit of this field based on least significant bit alignment. |
| 16 | SoftwareVersion | A software version number of the optical head end device, which should be encoded in an ASCII mode. If the version number is shorter than 16 bytes, the value is placed in the least significant bit of this field based on least significant bit alignment. |
| 2 | Chip Model | A chip model, which is represented by using a hexadecimal unsigned number. |
| 1 | Revision | A chip revision status, which is reported by the optical head end based on an actual chip status. |
| 3 | IC_Version/Date | A chip version (hardware). If there is no version number, the value may be a design date in a format of YY/MM/DD. |
| 2 | ID range | A maximum ID number specification supported by the optical head end |

(2) The OHE ID is for defining an optical head end identifier allocated to the optical head end.

An attribute definition of the OHE ID is shown in the following Table 6:

TABLE 6

| Quantity of bytes | Field | Description |
|---|---|---|
| 2 | Type ID | 0x1 |
| 2 | Length | A value is 8. |
| 6 | MAC address | A MAC address of the optical head end is used |
| 2 | Node ID | A node ID allocated to the optical head end |

(3) The Bus version is for defining a bus version supported by the optical head end.

An attribute definition of the Bus version is shown in the following Table 7:

TABLE 7

| Quantity of bytes | Field | Description |
|---|---|---|
| 2 | Type ID | 0x2 |
| 2 | Length | A value is n * 1 (n ≥ 1). |
| 1 | Bus version 1 | A supported bus version number 1 |
| . . . | | |
| n | Bus version 2 | A supported bus version number n |

In at least one embodiment, with the development and update of the management protocol, version numbers is sequentially allocated to the management protocol based on 1, 2, . . . , and n. Management protocols supported by the controller and the optical head end is not limited to one version. The target management protocol determined by the two parties through negotiation is a management protocol of a latest version supported by both the controller and the optical head end.

During an implementation, based on the related attribute definitions in Table 5 to Table 7, the target information that needs to be transmitted is encapsulated into a TLV structure located in a payload field of the PDU according to a format between the controller and the target optical head end as used, and transmitted to a peer device, so that the controller discovers, configures, and manages the optical head end. Therefore, related information for implementing a plurality of management purposes is better transmitted between the controller and the target optical head end, and scalability is good. In addition, this device management solution further supports the controller in diagnosing, analyzing, and processing an optical path connected to the optical head end, a fault, and the like, so as to facilitate subsequent maintenance of the optical bus network and improve management efficiency.

Figure 9:
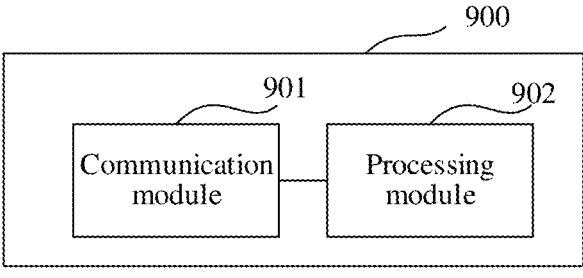
FIG. 9 is a schematic diagram of a communication apparatus according to at least one embodiment.

FIG. 9 is a schematic block diagram of an apparatus 900 according to at least one embodiment. The apparatus is configured to implement functions of a controller or an optical head end in an optical bus network in the foregoing method. For example, the apparatus is a software module or a chip system. The chip system includes a chip, or includes a chip and another discrete device. The apparatus 900 includes a communication module 901. The communication module 901 communicates with the outside. The processing module 902 is configured to perform processing. The communication module 901 is also referred to as a communication interface, a transceiver module, an input/output interface, or the like. For example, the communication module includes a sending module and a receiving module, which are respectively configured to perform sending or receiving steps performed by the controller or the optical head end in the procedures shown in FIG. 5 to FIG. 7.

In an example, the apparatus 900 implements the steps implemented by the controller in the procedures shown in FIG. 5 to FIG. 7. The communication module 901 is configured to perform receiving and sending related operations on a controller side in the foregoing method embodiments. The processing module 902 is configured to perform processing related operations on the controller side in the foregoing method embodiments, including but not limited to: generating information and a message sent by the communication module 901, and/or performing demodulation and decoding on a signal received by the communication module 901.

For example, under control of the processing module 902, the communication module 901 is configured to communicate with another device. For example, the communication module 901 sends a target optical head end identifier to a target optical head end in response to the controller discovering the target optical head end, where the target optical head end identifier is for identifying the target optical head end; the processing module 902 determines a target management protocol from management protocols supported by the target optical head end; and the processing module 902 communicates target information with the target optical head end based on the target optical head end identifier and the target management protocol by using the communication module 901, where the target information is used by the controller to manage the target optical head end and/or at least one optical terminal managed by the target optical head end.

For example, the target management protocol is for defining a frame structure of a message that carries the target information, the frame structure includes a header field and a payload field, the target optical head end identifier is located in the header field, and the target information is located in the payload field.

For example, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

For example, the frame structure further includes another field for carrying other information that needs to be further transmitted. For example, the frame structure further includes a protocol data unit PDU type field, the PDU type field in the frame structure is for carrying a predetermined value, and the predetermined value indicates that the frame structure is a management protocol frame structure. In this way, frame structures for implementing different purposes is distinguished through the PDU type field. For example, the frame structure further includes a command indicator, and the command indicator indicates that the frame structure corresponds to any one of the following message types: a read operation, a read response operation, a set operation, a set response operation, and an event report operation. For example, the frame structure further includes an event field, and the event field is for carrying alarm event information reported by the target optical head end to the controller.

This is merely an example description of fields included in the frame structure and constitutes no limitation. During a specific implementation, the fields included in the frame structure is defined or negotiated based on a service usage, an application scenario, or the like in the frame structure. Details are not described herein again.

For example, the communication module 901 is configured to: broadcast a discovery packet, where the discovery packet includes a destination identifier corresponding to the discovery packet; receive a discovery packet response sent by the target optical head end based on the destination identifier, where the discovery packet response includes a media access control MAC address of the target optical head end; and send the target optical head end identifier to the target optical head end based on the MAC address of the target optical head end.

For example, the processing module 902 is configured to: receive first version information from the target optical head end by using the communication module 901, where the first version information indicates a version of each of the management protocols supported by the target optical head end; and determine, based on the first version information, the target management protocol from the management protocols supported by the target optical head end.

For example, the processing module 902 is configured to: determine, based on the first version information and second version information, the target management protocol from management protocols supported by both the controller and the optical head end, where the second version information indicates a version of each of management protocols supported by the controller. For example, the target management protocol is a management protocol of a latest version supported by both the controller and the target optical head end.

For example, the optical bus network includes a plurality of optical head ends, and the target optical head end is any one of the plurality of optical head ends, where the controller and the target optical head end are located in a same physical entity; or the controller is disposed independently of the plurality of optical head ends.

In an example, the apparatus 900 implements the steps implemented by the optical terminal in the procedures shown in FIG. 5 to FIG. 7. The communication module 901 is configured to perform receiving and sending related operations on an optical terminal side in the foregoing method embodiments. The processing module 902 is configured to perform processing related operations on the optical terminal side in the foregoing method embodiments, including but not limited to: generating information and a message sent by the communication module 901, and/or performing demodulation and decoding on a signal received by the communication module 901.

For example, the communication module 901 is configured to receive a target optical head end identifier from the controller, where the target optical head end identifier is sent by the controller in response to the controller discovering a target optical head end and is for identifying the target optical head end; and the processing module 902 is configured to transmit target information to the controller based on the target optical head end identifier and a target management protocol by using the communication module 901, where the target information is used by the controller to manage the target optical head end and/or at least one optical terminal managed by the target optical head end, and the target management protocol is determined by the controller from management protocols supported by the target optical head end.

For example, the target management protocol is for defining a frame structure of a message that carries the target information, the frame structure includes a header field and a payload field, the target optical head end identifier is located in the header field, and the target information is located in the payload field.

For example, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

For example, the frame structure further includes a protocol data unit PDU type field, the PDU type field in the frame structure is for carrying a predetermined value, and the predetermined value indicates that the frame structure is a management protocol frame structure.

For example, the optical bus frame structure further includes a command indicator, and the command indicator indicates that the optical bus frame structure corresponds to any one of the following message types: a read operation, a read response operation, a set operation, a set response operation, and an event report operation.

For example, the frame structure further includes an event field, and the event field is for carrying alarm event information reported by the target optical head end to the controller.

For example, that the target optical head end receives a target optical head end identifier from the controller includes: The target optical head end receives a discovery packet from the controller, where the discovery packet includes a destination identifier corresponding to the discovery packet; the target optical head end sends a discovery packet response to the controller based on the destination identifier, where the discovery packet response includes a MAC address of the target optical head end; and the target optical head end receives the target optical head end identifier sent by the controller based on the MAC address of the target optical head end.

For example, the communication module 901 is further configured to: send first version information to the controller based on the target optical head end identifier, where the first version information indicates a version of each of the management protocols supported by the target optical head end.

For example, the target management protocol is a management protocol of a latest version supported by both the target optical head end and the controller.

For example, the target optical head end has a broadcast discovery state, a unicast discovery state, and a working state, where in response to the target optical head end being in the broadcast discovery state, the target optical head end is configured to receive the target optical head end identifier from the controller; after receiving the target optical head end identifier from the controller, the target optical head end is configured to communicate with the controller in the unicast discovery state based on the target optical head end identifier, so that the controller determines the target management protocol; and in response to the target optical head end being in the working state, the target optical head end is configured to transmit the target information to the controller based on the target optical head end identifier and the target management protocol.

For example, the optical bus network includes a plurality of optical head ends, and the target optical head end is any one of the plurality of optical head ends, where the controller and the target optical head end are located in a same physical entity; or the controller is disposed independently of the plurality of optical head ends.

Division of the modules in embodiments described herein is an example and is merely logical function division, and there is other division manners during an actual implementation. In addition, functional modules in at least one embodiment is integrated into one processor, or each of the modules exist alone physically, or two or more modules is integrated into one module. The integrated module is implemented in a form of hardware, or is implemented in a form of a software functional module.

A function of the communication module in the foregoing embodiment is implemented by a transceiver (which is also referred to as a transceiver machine), and a function of the processing module is implemented by a processor. The transceiver includes a transmitter and/or a receiver, which are respectively configured to implement a function of the sending module and/or a function of the receiving module. The following provides an example for description with reference to FIG. 10.

Figure 10:
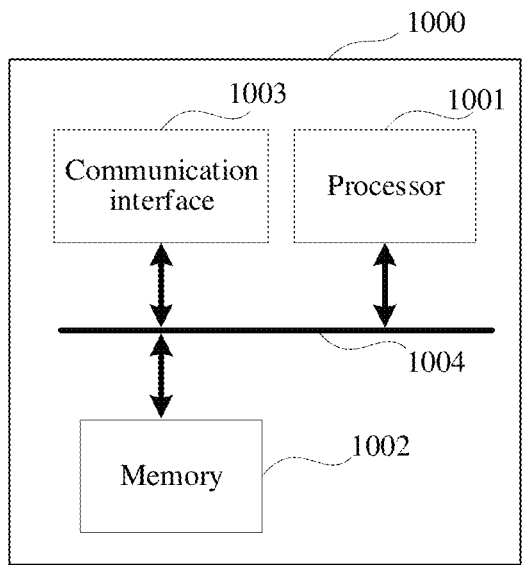
FIG. 10 is a schematic diagram of a communication apparatus according to at least one embodiment.

FIG. 10 is a schematic block diagram of an apparatus 1000 according to at least one embodiment. The apparatus 1000 shown in FIG. 10 is an implementation method of a hardware circuit of the apparatus shown in FIG. 9. The apparatus is applicable to the procedures shown in FIG. 5 to FIG. 7, and perform functions of the controller and the optical head end in the foregoing method embodiments. For ease of description, FIG. 10 shows only main components of the apparatus.

The apparatus 1000 shown in FIG. 10 includes at least one processor 1001. The apparatus 1000 further includes at least one memory 1002, configured to store program instructions and/or data. The memory 1002 is coupled to the processor 1001. The coupling in at least one embodiment is an indirect coupling or a communication connection between apparatuses, units, or modules in an electrical form, a mechanical form, or another form, and is used for information exchange between the apparatuses, the units, or the modules. The processor 1001 performs an operation in collaboration with the memory 1002. The processor 1001 executes the program instructions stored in the memory 1002. At least one of the at least one memory 1002 is included in the processor 1001.

The apparatus 1000 further includes a communication interface 1003, configured to communicate with another device by using a transmission medium, so that the communication apparatus 1000 communicates with the another device. In at least one embodiment, the communication interface is a transceiver, a circuit, a bus, a module, or a communication interface of another type. In at least one embodiment, in response to the communication interface being a transceiver, the transceiver includes an independent receiver and an independent transmitter; or the communication interface is a transceiver integrating a transceiver function, or an interface circuit.

A connection medium between the processor 1001, the memory 1002, and the communication interface 1003 is not limited in at least one embodiment. In at least one embodiment, in FIG. 10, the memory 1002, the processor 1001, and the communication interface 1003 are connected by using a communication bus 1004. The bus is represented by a bold line in FIG. 10, and a connection manner between other components is merely an example for description, and is not limited thereto. The bus includes an address bus, a data bus, a control bus, and the like. For ease of representation, in FIG. 10, only one bold line is used for representation, but is not limited to only one bus, only one type of bus, or the like.

In an example, the apparatus 1000 is configured to implement the steps performed by the controller in the procedures shown in FIG. 5 to FIG. 7. The apparatus 1000 is a controller, or a chip or a circuit in a controller. The communication interface is configured to perform receiving and sending related operations on an optical head end side in the foregoing embodiments. The processor 1001 is configured to perform processing related operations on the optical head end in the foregoing method embodiments, including but not limited to: generating information and a message sent by the communication interface 1003, and/or performing demodulation and decoding on a signal received by the communication interface 1003.

For example, under control of the processor 1001, the communication interface 1003 is configured to communicate with another device. For example, the communication interface 1003 sends a target optical head end identifier to a target optical head end in response to the controller discovering the target optical head end, where the target optical head end identifier is for identifying the target optical head end; the processor 1001 determines a target management protocol from management protocols supported by the target optical head end; and the processor 1001 communicates target information with the target optical head end based on the target optical head end identifier and the target management protocol by using the communication interface 1003, where the target information is used by the controller to manage the target optical head end and/or at least one optical terminal managed by the target optical head end.

For example, the target management protocol is for defining a frame structure of a message that carries the target information, the frame structure includes a header field and a payload field, the target optical head end identifier is located in the header field, and the target information is located in the payload field.

For example, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

For example, the frame structure further includes another field for carrying other information that needs to be further transmitted. For example, the frame structure further includes a protocol data unit PDU type field, the PDU type field in the frame structure is for carrying a predetermined value, and the predetermined value indicates that the frame structure is a management protocol frame structure. In this way, frame structures for implementing different purposes is distinguished through the PDU type field. For example, the frame structure further includes a command indicator, and the command indicator indicates that the frame structure corresponds to any one of the following message types: a read operation, a read response operation, a set operation, a set response operation, and an event report operation. For example, the frame structure further includes an event field, and the event field is for carrying alarm event information reported by the target optical head end to the controller.

This is merely an example description of fields included in the frame structure and constitutes no limitation. During a specific implementation, the fields included in the frame structure is defined or negotiated based on a service usage, an application scenario, or the like in the frame structure. Details are not described herein again.

For example, the communication interface 1003 is configured to: broadcast a discovery packet, where the discovery packet includes a destination identifier corresponding to the discovery packet; receive a discovery packet response sent by the target optical head end based on the destination identifier, where the discovery packet response includes a media access control MAC address of the target optical head end; and send the target optical head end identifier to the target optical head end based on the MAC address of the target optical head end.

For example, the processor 1001 is configured to: receive first version information from the target optical head end by using the transceiver, where the first version information indicates a version of each of the management protocols supported by the target optical head end; and determine, based on the first version information, the target management protocol from the management protocols supported by the target optical head end.

For example, the processor 1001 is configured to: determine, based on the first version information and second version information, the target management protocol from management protocols supported by both the controller and the optical head end, where the second version information indicates a version of each of management protocols supported by the controller. For example, the target management protocol is a management protocol of a latest version supported by both the controller and the target optical head end.

For example, the optical bus network includes a plurality of optical head ends, and the target optical head end is any one of the plurality of optical head ends, where the controller and the target optical head end are located in a same physical entity; or the controller is disposed independently of the plurality of optical head ends.

In an example, the apparatus 1000 is configured to implement the steps performed by the optical head end in the procedures shown in FIG. 5 to FIG. 7. The apparatus 1000 is an optical head end, or a chip or a circuit in an optical head end. The communication interface is configured to perform receiving and sending related operations on an optical head end side in the foregoing embodiments. The processor 1001 is configured to perform processing related operations on the optical head end in the foregoing method embodiments, including but not limited to: generating information and a message sent by the communication interface 1003, and/or performing demodulation and decoding on a signal received by the communication interface 1003.

For example, the communication interface 1003 is configured to receive a target optical head end identifier from the controller, where the target optical head end identifier is sent by the controller in response to the controller discovering a target optical head end and is for identifying the target optical head end; and the processor 1001 is configured to transmit target information to the controller based on the target optical head end identifier and a target management protocol by using the communication interface 1003, where the target information is used by the controller to manage the target optical head end and/or at least one optical terminal managed by the target optical head end, and the target management protocol is determined by the controller from management protocols supported by the target optical head end.

For example, the target management protocol is for defining a frame structure of a message that carries the target information, the frame structure includes a header field and a payload field, the target optical head end identifier is located in the header field, and the target information is located in the payload field.

For example, the target information uses at least one type-length-value TLV structure, where a type field in each TLV structure is for carrying type indication information of a managed object, a length field in each TLV structure indicates a length of object content corresponding to the managed object, and a value field in each TLV structure is for carrying the object content.

For example, the frame structure further includes a protocol data unit PDU type field, the PDU type field in the frame structure is for carrying a predetermined value, and the predetermined value indicates that the frame structure is a management protocol frame structure.

For example, the optical bus frame structure further includes a command indicator, and the command indicator indicates that the optical bus frame structure corresponds to any one of the following message types: a read operation, a read response operation, a set operation, a set response operation, and an event report operation.

For example, the frame structure further includes an event field, and the event field is for carrying alarm event information reported by the target optical head end to the controller.

For example, that the target optical head end receives a target optical head end identifier from the controller includes: The target optical head end receives a discovery packet from the controller, where the discovery packet includes a destination identifier corresponding to the discovery packet; the target optical head end sends a discovery packet response to the controller based on the destination identifier, where the discovery packet response includes a MAC address of the target optical head end; and the target optical head end receives the target optical head end identifier sent by the controller based on the MAC address of the target optical head end.

For example, the communication interface 1003 is further configured to: send first version information to the controller based on the target optical head end identifier, where the first version information indicates a version of each of the management protocols supported by the target optical head end.

For example, the target management protocol is a management protocol of a latest version supported by both the target optical head end and the controller.

For example, the target optical head end has a broadcast discovery state, a unicast discovery state, and a working state, where in response to the target optical head end being in the broadcast discovery state, the target optical head end is configured to receive the target optical head end identifier from the controller; after receiving the target optical head end identifier from the controller, the target optical head end is configured to communicate with the controller in the unicast discovery state based on the target optical head end identifier, so that the controller determines the target management protocol; and in response to the target optical head end being in the working state, the target optical head end is configured to transmit the target information to the controller based on the target optical head end identifier and the target management protocol.

For example, the optical bus network includes a plurality of optical head ends, and the target optical head end is any one of the plurality of optical head ends, where the controller and the target optical head end are located in a same physical entity; or the controller is disposed independently of the plurality of optical head ends.

In at least one embodiment, the processor is a general-purpose processor, a digital signal processor, an application-specific integrated circuit, a field programmable gate array or another programmable logic device, a discrete gate or transistor logic device, or a discrete hardware component, and implements or executes the methods, steps, and logical block diagrams disclosed in at least one embodiment. The general-purpose processor is a microprocessor or any conventional processor. The steps of the method disclosed with reference to at least one embodiment is directly performed by a hardware processor, or is performed by using a combination of hardware in the processor and a software module.

In at least one embodiment, the memory is a non-volatile memory, such as a hard disk drive (hard disk drive, HDD) or a solid-state drive (solid-state drive, SSD), or is a volatile memory (volatile memory), such as a random access memory (random access memory, RAM). The memory is any other medium that carries or stores expected program code in a form of an instruction or a data structure and that is accessed by a computer, but is not limited thereto. The memory in at least one embodiment is alternatively a circuit or any other apparatus that implements a storage function, and is configured to store program instructions and/or data.

All or some of the methods in at least one embodiment is implemented by using software, hardware, firmware, or any combination thereof. In response to software being used to implement the embodiments, all or some of the embodiments is implemented in a form of a computer program product. The computer program product includes one or more computer instructions. In response to the computer program instructions being loaded and executed on a computer, the procedures or functions according to at least one embodiment are all or partially generated. The computer is a general-purpose computer, a dedicated computer, a computer network, a network device, user equipment, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device such as a server or a data center, integrating one or more usable media. The usable medium is a magnetic medium (for example, a floppy disk, a hard disk, or a magnetic tape), an optical medium (for example, a digital video disc (digital video disc, DVD)), or a semiconductor medium (for example, an SSD).

Apparently, a person skilled in the art is able to make various modifications and variations to at least one embodiment without departing from the scope of embodiments described herein. Embodiments described herein are intended to cover these modifications and variations provided that the modifications and variations of embodiments described herein fall within the scope of the claims and equivalent technologies thereof.

In at least one embodiment, "at least one" means one or more, and "a plurality of" means two or more. The term "and/or" describes an association relationship between associated objects and indicates that three relationships exist. For example, A and/or B indicates the following three cases: Only A exists, both A and B exist, and only B exists, where A and B is singular or plural. The character "/" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c represent: a, b, c, a and b, a and c, b and c, or a, b, and c, where a, b, and c is single or plural.

What is claimed is:

1. A device management method, applied to an optical bus network, the optical bus network comprising a target optical head end and at least one optical terminal managed by the target optical head end, the optical bus network further comprising a controller, and the method comprising:

performing, by the controller, a discovery process for discovering the target optical head end, wherein the discovery process includes broadcasting a discovery packet that includes a destination identifier corresponding to the discovery packet and receiving a discovery packet response from the target optical head end based on the destination identifier;

in response to receiving the discovery packet response, sending, by the controller, a target optical head end identifier to the target optical head end, wherein the target optical head end identifier identifies the target optical head end;

determining, by the controller, a target management protocol from management protocols supported by the target optical head end; and communicating, by the controller, target information with the target optical head end based on the target optical head end identifier and the target management protocol, wherein the target information is used by the controller to manage the target optical head end and/or the at least one optical terminal managed by the target optical head end.

2. The method according to claim 1, wherein the determining, by the controller, the target management protocol includes determining the target management protocol that defines a frame structure of a message that carries the target information, the frame structure includes a header field and a payload field, the target optical head end identifier is located in the header field, and the target information is located in the payload field.

3. The method according to claim 2, wherein the determining the target management protocol that defines the frame structure of the message that carries the target information includes determining the target management protocol that defines the frame structure of the message that carries the target information that uses at least one type-length-value TLV structure, wherein a type field in each TLV structure is for carrying type indication information of a managed object, a length field in each TLV structure indicates a length of object content corresponding to the managed object, and a value field in each TLV structure is for carrying the object content.

4. The method according to claim 2, wherein the determining the target management protocol that defines the frame structure of the message that carries the target information includes determining the target management protocol defines the frame structure that includes a protocol data unit PDU type field, the PDU type field in the frame structure carries a predetermined value, and the predetermined value indicates that the frame structure is a management protocol frame structure.

5. The method according to claim 2, wherein the determining the target management protocol that defines the frame structure of the message that carries the target information includes determining the target management protocol that defines the frame structure that further includes a command indicator, and the command indicator indicates that the frame structure corresponds to any one of the following message types: a read operation, a read response operation, a set operation, a set response operation, or an event report operation.

6. The method according to claim 2, wherein the determining the target management protocol that defines the frame structure of the message that carries the target information includes determining the target management protocol that defines the frame structure further includes an event field, and the event field carries alarm event information reported by the target optical head end to the controller.

7. The method according to claim 1, wherein the receiving, by the controller, the discovery packet response includes receiving a media access control MAC address of the target optical head end in the discovery packet response; and sending, by the controller, the target optical head end identifier to the target optical head end based on the MAC address of the target optical head end.

8. The method according to claim 1, wherein the determining, by the controller, the target management protocol from management protocols supported by the target optical head end includes:

receiving, by the controller, first version information from the target optical head end, wherein the first version information indicates a version of each of the management protocols supported by the target optical head end; and determining, by the controller based on the first version information, the target management protocol from the management protocols supported by the target optical head end.

9. A communication method, applied to an optical bus network, the optical bus network comprising a target optical head end and at least one optical terminal managed by the target optical head end, the optical bus network further comprising a controller, and the method comprising:

receiving, by the target optical head end, a discovery packet that includes a destination identifier corresponding to the discovery packet and sending a discovery packet response from the target optical head end based on the destination identifier;

in response to sending the discovery packet response, receiving, by the target optical head end, a target optical head end identifier from the controller, wherein the target optical head end identifier is for identifying the target optical head end; and transmitting, by the target optical head end, target information to the controller based on the target optical head end identifier and a target management protocol, wherein the target information is used by the controller to manage the target optical head end and/or the at least one optical terminal managed by the target optical head end, and the target management protocol is determined by the controller from management protocols supported by the target optical head end.

10. The method according to claim 9, wherein the transmitting, by the target optical head end, the target information to the controller based on the target optical head end identifier and the target management protocol includes transmitting target information to the controller based on the target optical head end identifier and the target management protocol that defines a frame structure of a message that carries the target information, the frame structure includes a header field and a payload field, the target optical head end identifier is located in the header field, and the target information is located in the payload field.

11. The method according to claim 10, wherein the transmitting target information to the controller includes transmitting the target information that uses at least one type-length-value TLV structure, wherein a type field in each TLV structure carries type indication information of a managed object, a length field in each TLV structure indicates a length of object content corresponding to the managed object, and a value field in each TLV structure carries the object content.

12. The method according to claim 10, wherein the transmitting the target information to the controller based on the target optical head end identifier and the target management protocol that defines the frame structure of the message that carries the target information includes transmitting the target information to the controller based on the target optical head end identifier and the target management protocol that defines the frame structure that includes a protocol data unit PDU type field, the PDU type field in the frame structure carries a predetermined value, and the predetermined value indicates that the frame structure is a management protocol frame structure.

13. The method according to claim 10, wherein the transmitting the target information to the controller based on the target optical head end identifier and the target management protocol that defines the frame structure of the message that carries the target information includes transmitting the target information to the controller based on the target optical head end identifier and the target management protocol that defines the frame structure that includes a command indicator, and the command indicator indicates that the frame structure corresponds to any one of the following message types: a read operation, a read response operation, a set operation, a set response operation, or an event report operation.

14. The method according to claim 10, wherein the transmitting the target information to the controller based on the target optical head end identifier and the target management protocol that defines the frame structure of the message that carries the target information includes transmitting the target information to the controller based on the target optical head end identifier and the target management protocol that defines the frame structure that includes an event field, and the event field carries alarm event information reported by the target optical head end to the controller.

15. The method according to claim 9, wherein the sending, by the target optical head end, the discovery packet response includes sending a MAC address of the target optical head end in the discovery packet response; and receiving, by the target optical head end, the target optical head end identifier sent by the controller based on the MAC address of the target optical head end.

16. The method according to claim 9, wherein the method further comprises:

sending, by the target optical head end, first version information to the controller based on the target optical head end identifier, wherein the first version information indicates a version of each of the management protocols supported by the target optical head end.

17. A target optical head end, comprising:

a transceiver configured to communicate with another device;

memory storing program instructions; and a processor connected to the memory, wherein the processor is configured to execute the instructions to perform operations to:

receive, from a controller, a discovery packet that includes a destination identifier corresponding to the discovery packet and sending a discovery packet response to the controller based on the destination identifier;

in response to sending the discovery packet response, receive a target optical head end identifier from the controller, wherein the target optical head end identifier is for identifying the target optical head end; and transmit target information to the controller based on the target optical head end identifier and a target management protocol, wherein the target information is used by the controller to manage the target optical head end and/or at least one optical terminal managed by the target optical head end, and the target management protocol is determined by the controller from management protocols supported by the target optical head end.

18. The target optical head end according to claim 17, wherein the target management protocol defines a frame structure of a message that carries the target information, the frame structure includes a header field and a payload field, the target optical head end identifier is located in the header field, and the target information is located in the payload field.

19. The target optical head end according to claim 17, wherein the target information uses at least one type-length-value TLV structure, wherein a type field in each TLV structure carries type indication information of a managed object, a length field in each TLV structure indicates a length of object content corresponding to the managed object, and a value field in each TLV structure carries the object content.

20. The target optical head end according to claim 18, wherein the frame structure further includes a protocol data unit PDU type field, the PDU type field in the frame structure carries a predetermined value, and the predetermined value indicates that the frame structure is a management protocol frame structure.

* * * * *